(No Model.) 2 Sheets—Sheet 1.
G. H. SMITH & J. KIENARDT.
HORSE HAY RAKE.
No. 299,430. Patented May 27, 1884.
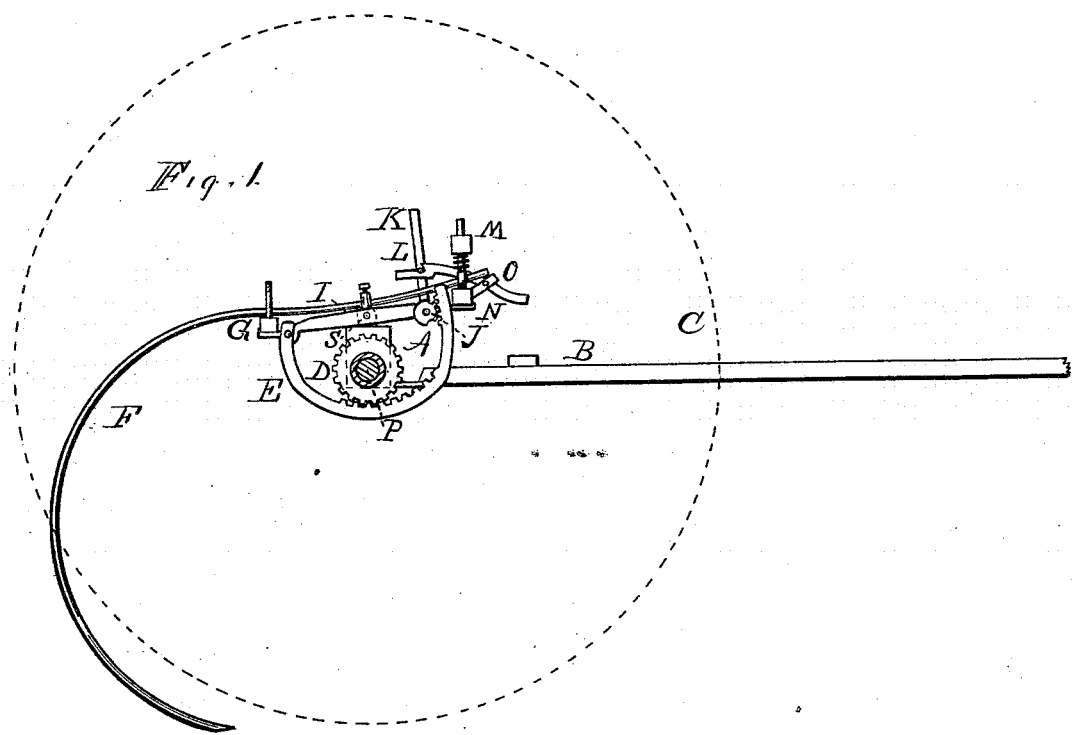
WITNESSES:
John Trautmann
Leopold Leibold
INVENTORS
George H. Smith
John Kienardt
BY B. Pickering
ATTORNEY (No Model.) 2 Sheets—Sheet 2.
G. H. SMITH & J. KIENARDT.
HORSE HAY RAKE.
No. 299,430. Patented May 27, 1884.
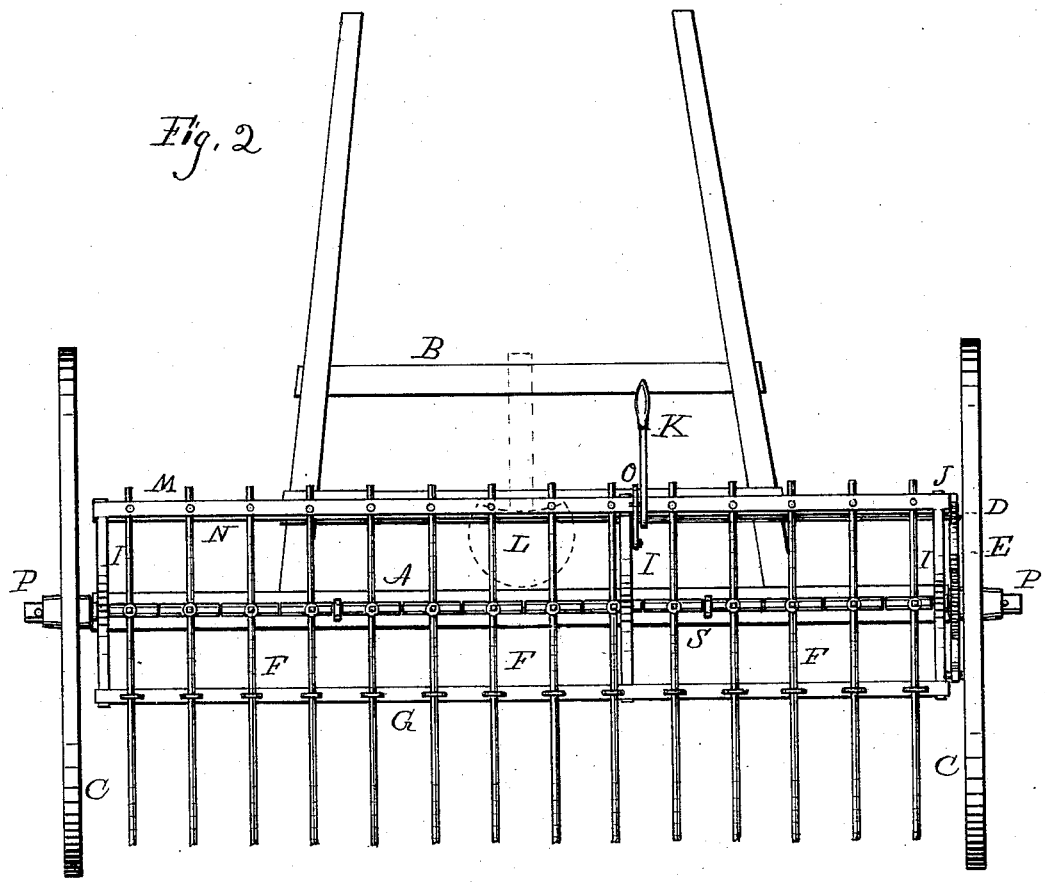

UNITED STATES PATENT OFFICE.

GEORGE H. SMITH AND JOHN KIENARDT, OF DAYTON, OHIO.

HORSE HAY-RAKE.

SPECIFICATION forming part of Letters Patent No. 299,430, dated May 27, 1884.

Application filed October 17, 1883. (No model.)

*To all whom it may concern:*

Be it known that we, GEORGE H. SMITH and JOHN KIENARDT, citizens of the United States, residing at Dayton, in the county of Montgomery and State of Ohio, have invented a certain new and useful Improvement in Horse-Rakes; and we do hereby declare that the following is a full, clear, and exact description of the invention, which will enable others skilled in the art to which it appertains to make and use the same, reference being had to the accompanying drawings, and to the letters of reference marked thereon, which form a part of this specification.

Our invention relates to improvements in the Hollingsworth horse-rake, or other forms using a rocking frame; and it consists in an automatic dumping device, the object being to dump the rake by a simple and cheap mechanism which consists of a curved bar provided with segment-racks, and pivoted to the rear end of the rocker-arm, and supported in the front by segment-gear attached to a rock-shaft extending partly across the rake, and the device for engaging and detaching the lever that oscillates the segment-gear for the purpose of throwing in and out of gear the aforesaid rack-bar with the cog-wheel attached to the hub of the ground-wheel.

In the accompanying drawings, Figure 1 is a side elevation of our improvements as attached to a rake, and Fig. 2 is a plan view.

A is the wooden axle, and P the spindle which carries one of the ground-wheels. To the lower front edge of the axle A is bolted the thill-frame B. The dotted line C, Fig. 1, indicates the position of the ground-wheels.

To the metallic hub of one of the ground-wheels is attached the cog-wheel D, and a backing-ratchet may be interposed to release the ground-wheel from the gear-wheel when a backward movement is given to said ground-wheel, or, in case the device is applied to both wheels, to permit the rake to be operated while the machine is turning to the right or left.

I are the rocker-arms, which are pivoted on bearings over the center of the axle.

To the rod S, forming the pivot, are attached the fastenings for the teeth F.

To the rear end of the rocker-arms is attached the guide-bar G, to which are attached staple-guides for the teeth, and to the forward end are attached guide-bars M and N, within which are supported guide-pins with eyes to receive the ends of the teeth, and around which, above the eyes, are spiral springs. The rear end of the rack-bar E is pivoted to the rocker-arm I. This rack-bar is curved downward and forward, passing under the axle, and then upward to a point near the forward end of the rocker-arm. It is provided with a segment-rack adapted to engage the wheel D, and at its forward end with a segment-rack engaging with a segment-gear, J, on a rock-shaft extending to near the center of the rake-head, where it is supported in a bearing on the central rocker-arm. To this rock-shaft is attached the lever K at a point where it can be conveniently grasped by the hand of the operator, who occupies the seat indicated by dotted lines at L, Fig. 2. When drawn backward, the pawl O engages a pin on the side of said lever and holds the same in a fixed position, and in this position the lower segment-rack of the bar E engages the cog-wheel D of the hub, thereby causing the rake-teeth to be carried up until said pawl O is disengaged by coming in contact with the cross-bar of the thills. The curved rack-bar then drops by gravity, thus throwing it out of gear with the cog-wheel, and the teeth fall back to the ground to receive a new load. The faces of the lower or central series of cogs on the rack-bar have for the center of their curve the pivot of the rocking frame, and the forward series the pivot of said rack-bar.

The detaching device may be varied; but the essential features of the described device must be preserved.

Having fully described our invention, what we claim as new, and desire to secure by Letters Patent, is—

1. In a horse-rake, the combination of the ground-wheel provided with the cog-wheel D, the rocker-arm I, the curved bar E, provided with the segment-racks, and the segment-gear J, substantially as and for the purpose set forth.

2. The combination of the ground-wheel provided with the cog-wheel D, the rocker-arm I, the rack-bar E, segment-gear J, lever K, and pawl O, substantially as and for the purpose set forth.

In testimony that we claim the foregoing as our own we affix our signatures in presence of two witnesses.

GEORGE H. SMITH.
JOHN KIENARDT.

Witnesses:
B. PICKERING,
W. H. CLARK.